July 15, 1952      A. B. McCALL      2,603,308
AIR FILTER AND BREATHER FOR FLUID FUEL CONTAINERS
Filed Feb. 20, 1947

INVENTOR
Arthur B. McCall.

Patented July 15, 1952

2,603,308

UNITED STATES PATENT OFFICE 2,603,308

AIR FILTER AND BREATHER FOR FLUID FUEL CONTAINERS

Arthur B. McCall, Springfield, Ill., assignor of one-half to Vertus C. Barnett, Greenview, Ill.

Application February 20, 1947, Serial No. 729,791

1 Claim. (Cl. 183—44)

My invention relates to filters and especially to air filters; a purpose being in my device to provide means for more successfully keeping liquid clean and clear of earthen dust, plant dust and the like and free of all water, when in a container requiring an intake of air for its release.

A purpose of my invention is to advance a new teaching in air filter and breather service with liquid fuel containers by which liquid fuels may be kept clean, clear of earthen dust, plant dust and free of all water, when handled through a container requiring an intake of air for its release therefrom.

A further purpose is to prevent the fuel in such container from back splashing through the air filter out upon the container surface.

A further purpose of my invention is to provide an air filter and breather for gasoline and fuel oil containers needing an intake of air for release of the fuel, wherein the air filter and breather is operatively secured in place either on the fuel intake cap or in a desired position on the container body so that when any and all such liquid fuel, such as gasoline, fuel oil and the like, are released from this original container, then all the air entering this container for the fuel's release will at once be filtered and made free of all earthen and plant dust and free of all moisture; while at the same time the fuel will be prevented from back splashing through the filter, out upon the container top surface.

A particular purpose of my invention is to provide a new air filter and breather for liquid fuel containers wherein the same combination of parts which filter and prevent back splash of fuel will so co-operate in functions without valve action as to effectively permit free breathing where liberated volatile vapors may be retarded in condensing chambers, trapped and returned to the fuel tank from whence they came.

I achieve my purposes by my invention described in this specification, defined in the claim and shown in the drawings wherein:

Figure 2:
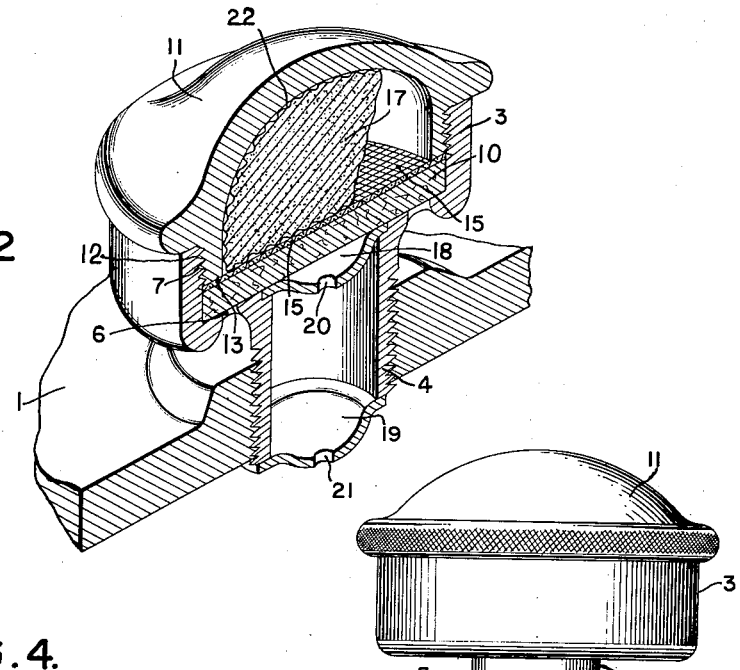
Figure 2 is a perspective of Figure 1.

I shall now describe my invention as I disclose its advantages and details of construction as the drawings are studied.

Air cleaners of certain kinds are known to be on the market and in general use but the novel use and operable features of my device are most practical and serviceable.

On account of varied experiences and numerous difficulties arising from a dirty and watery gasoline or fuel oil there has been a general effort made among users of tractors, combines, trucks and the like, to discover the source of trouble and correct it.

Mechanics have felt that it was wise to use certain types of fuel filters along the fuel line from the fuel tank to the engine, and some help has obviously been achieved by certain devices in this way; but in my new invention I am able to achieve with my new teaching a result that has proven to be rather startling to mechanics in its technical operation and most effective in its results when used as I have found to be the most successful place and condition in which it is to be used.

For instance, it is known that gasoline and fuel oil must be free from earthen dust, plant dust and moisture to work well and when farmers are using tractors and combines and the like, in harvest fields, they have been having numerous daily difficulties with their fuel regardless of what kind of gasoline or fuel oil is used; so that when they report this trouble to others the feeling is spread that certain fuels (whichever make happened to be thus used), is of poor quality, which gets the fuel producers on edge, in spite of all that is done to try to keep fuels clean.

It is here that I introduce my novel teaching by which I have already achieved most unusual and really encouraging results.

My purpose is to keep the gasoline, fuel oil and the like, clean and free from moisture from the time it is refined until it is consumed and to prevent fuel loss by back splashing in service, out on the container surface.

Thus as a result of a series of most successful experiments and practical field tests, I have found it wise to attach a breather designed to filter the air and dehydrate all the moisture entering a fluid fuel container, preferably secured to the tank cap or shaped to define such cap or secured to the tank body, so that whenever fuel is to be released from the tanks anywhere from the refinery until it is consumed, then any and all air entering the fuel tank for such fuel release, will have to enter it through this air filter, which will not only keep clean the fuel but will extract all moisture from any such air as it enters the tank.

Note here that a vital feature of my invention is provision of means in the same filter and breather device, whereby the cooperative combination of these same parts will so effectively retard and condense in condensing chambers the excessive flow of liberated volatile vapors from agitated fuel that a major part of such vapors are actually trapped and returned to the fuel tank as liquids; and this saving of commonly escaping vapors makes better motor performance, develops light internal tank pressure, a cleaner valve action and in many cases tests show from 1½ to 2½ miles increase per gallon of fuel.

I thus simplify my operation by attaching my filter to the fuel tank 1 or the tank cap 2 (not shown).

Thus in a study of my device it is important to realize the manner and place of its intended use before its merits may be fully comprehended.

I prefer to use a filter cup 3 the stem 4 of which has threads 5 which are screwed to the fuel tank body 1 or tank cap 2, preferably for its normal operation.

Cup 3 also has a series of air intake ports 6 on the bottom and threads 7 about the side 8.

A central stem passage 9 directs the incoming air into fuel tank 1 after this air has entered cup 3 through ports 6, passed up through filter element 10 and over to the center thereof where this air is again pulled through filter 10 into central passage 9, which action filters the air exactly where it will do the most good in the protection of the gasoline or fuel oil.

However I do much more in this same air movement as it is sucked through my filter device.

A filter cap 11 having threads 12 is adapted to thus threadably engage threads 7 of cup 3 to hold it in place on cup 3. As thus fitted together the bottom shoulder 13 of cap 11 when screwed down, will press down upon the periphery 14 of filter element 10 to hold it in place, and screen 15 under cap 11 will hold down the center of filter element 10 during a breather action from within the fuel tank, as well as to hold chemical 17 in place in cap 11.

It is my purpose, in the meantime, to include in this filter device a means by which all air passing through it will have all moisture extracted from it before this air passes down into fuel tank 1 through passage 9 of stem 4.

In order to most effectively achieve this purpose, I prefer to shape interior pocket 16 of cap 11 to define a space for holding a moisture extracting chemical 17 preferably held in place by screen 15 under cap shoulder 13.

When chemical 17 is thus held in pocket 16 of cap 11 directly in contact with any and all air entering this cup 3 through intake ports 6 this chemical will readily extract all moisture from such air and I thus achieve in one operation both the filtering and the dehydrating of all air thus drawn through my filter device down into fuel tank 1.

Any suitable moisture extracting chemical may be used here but at present I prefer to use what is known as silica gel, or the like and while a suitable grade of felt may serve my purpose as a filter element 10, yet there are other suitable filter elements that may serve my purpose.

Figure 4:
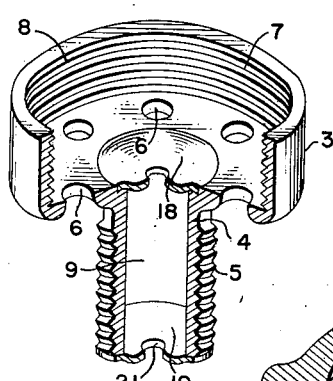
Figure 4 is a perspective of the cup portion of my device with the filter cap removed.
Figure 3:
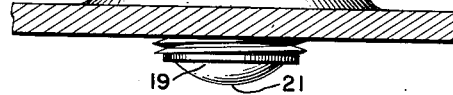
Figure 3 is a side view of my device.
Figure 1:
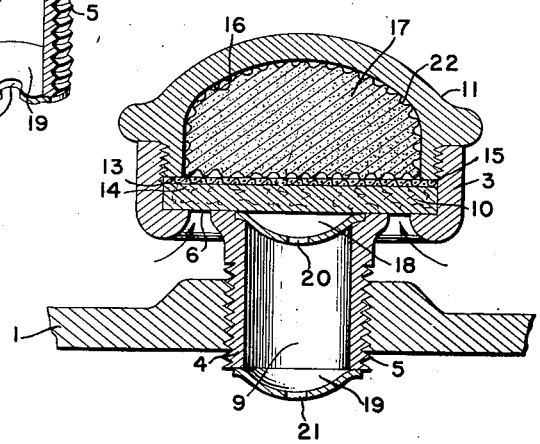
Figure 1 is a vertical half section of my novel air filter and breather.

Note, that in connection with the normal change in the internal fuel tank pressure the effect is to cause a normal breather action through my filter and breather and this causes a self cleaning effect on the air intake apertures 6 in the base of cup 3; while in Figures 1, 2 and 4, I am disclosing my use of perforated bulkheads 18 and 19 each having a central hole 20 and 21, respectively, for stopping back pressure which may develop in a fuel tank 1 and thus result in losing fuel out on the fuel tank.

Thus spaced bulkheads 18 and 19 with their respective air intake Venturi passages 20 and 21 define within tubular stem 4 a sort of vacuum chamber 9, which, taken together, will very definitely provide means to prevent the back splash loss of fuel out upon the fuel tank and the spoiling of paint.

I am not especially interested in having some certain design or size of filter device or have it made of any certain material, but a sack 22 will be a convenience for holding the moisture absorbent 17 for making quick changes.

Having described my invention what I claim is:

In an air filter and breather for liquid fuel containers, the combination comprising a cup, a lower central stem extending downwardly therefrom an upper and a lower perforated baffle plate in said stem forming a bottom chamber and a chamber above it for breaking up back splashing gasoline, liquid fuels and the like and the upper portion of said cup being provided with air intake apertures about its center, a felt pad disposed in said cup in position to cover said apertures, a screen fixed over said felt and silica gel granules supported by said screen, a cap removably engaging said cup in a manner securing said felt and screen and silica gel in fixed position in the cup, said upper and lower baffle plates of the lower cup chamber downwardly curved to define deflecting plates and upper and lower chambers for breaking up back splash fuel below said felt and said felt adapted to filter dust, dirt, grain fuzz and the like, means for securing said stem and cup to a liquid fuel container.

ARTHUR B. McCALL.

REFERENCES CITED

The following references are of record in the file of this patent:

UNITED STATES PATENTS

| Number | Name | Date |
|---|---|---|
| 850,807 | Dawe | Apr. 23, 1907 |
| 1,402,348 | Garner | Jan. 3, 1922 |
| 1,639,670 | Rydner | Aug. 23, 1927 |
| 1,841,691 | Wilson | Jan. 19, 1932 |
| 1,864,604 | Lemmerman | June 28, 1932 |
| 2,095,460 | Swords | Oct. 12, 1937 |
| 2,314,330 | Eshbaugh et al. | Mar. 23, 1943 |
| 2,323,160 | Stecher et al. | June 29, 1943 |